(12) United States Patent
Chen et al.

(10) Patent No.: US 8,166,817 B2
(45) Date of Patent: May 1, 2012

(54) ANGLE-MEASURING METHOD AND ANGLE-MEASURING GYROSCOPE SYSTEM FOR IMPLEMENTING THE SAME

(75) Inventors: Tsung-Lin Chen, Taipei (TW); Chien-Yu Chi, Taichung County (TW)

(73) Assignee: National Chiao Tung University, Hsinchu (TW)

( * ) Notice: Subject to any disclaimer, the term of this patent is extended or adjusted under 35 U.S.C. 154(b) by 417 days.

(21) Appl. No.: 12/611,268

(22) Filed: Nov. 3, 2009

(65) Prior Publication Data

US 2011/0005315 A1    Jan. 13, 2011

(30) Foreign Application Priority Data

Jul. 9, 2009  (TW) .............................. 98123199 A

(51) Int. Cl.
*G01C 19/56* (2006.01)
*G06F 15/00* (2006.01)

(52) U.S. Cl. .................... 73/504.14; 73/504.12; 702/145

(58) Field of Classification Search ............... 73/504.12, 73/504.13, 504.14, 504.04, 504.02; 702/141, 702/142, 143, 144, 145, 150, 151
See application file for complete search history.

(56) References Cited

U.S. PATENT DOCUMENTS

| | | | |
|---|---|---|---|
| 6,481,285 B1 | 11/2002 | Shkel et al. | |
| 6,928,874 B2 | 8/2005 | Painter et al. | |
| 6,934,660 B2 | 8/2005 | Painter et al. | |
| 7,040,164 B2 * | 5/2006 | Painter et al. | 73/504.13 |
| 8,037,755 B2 * | 10/2011 | Nagata et al. | 73/504.04 |
| 8,113,051 B2 * | 2/2012 | Matsumoto et al. | 73/504.12 |
| 2010/0100272 A1 * | 4/2010 | Chen et al. | 701/29 |
| 2011/0259100 A1 * | 10/2011 | Chen et al. | 73/504.12 |

* cited by examiner

*Primary Examiner* — Helen C. Kwok
(74) *Attorney, Agent, or Firm* — Frommer Lawrence & Haug LLP; Ronald R Santucci

(57) ABSTRACT

An angle-measuring method includes: configuring a state observer to calculate a set of estimated signals based on a set of previously calculated estimated parameters; configuring the state observer to calculate a gain thereof using a dynamic equation associated with a gyroscope; configuring the state observer to calculate a set of currently calculated estimated parameters using the dynamic equation associated with the gyroscope based on the gain calculated by the state observer, a set of sensing signals generated by a sensing module, and the estimated signals calculated by the state observer; and configuring an angle calculator to calculate an angle of rotation of the gyroscope based on a position and a velocity in the currently calculated estimated parameters calculated by the state observer and a stiffness coefficient of the gyroscope. An angle-measuring gyroscope system that implements the angle-measuring method is also disclosed.

26 Claims, 7 Drawing Sheets

ANGLE-MEASURING METHOD AND ANGLE-MEASURING GYROSCOPE SYSTEM FOR IMPLEMENTING THE SAME

CROSS-REFERENCE TO RELATED APPLICATION

This application claims priority of Taiwanese application No. 098123199, filed on Jul. 9, 2009, the disclosure of which is incorporated herein by reference.

BACKGROUND OF THE INVENTION

1. Field of the Invention

This invention relates to an angle-measuring method, and an angle-measuring gyroscope system for implementing the same.

2. Description of the Related Art

FIG. 1 illustrates a conventional angle-measuring gyroscope system 1 that includes a gyroscope 11, a sensing module 12, and a calculating module 13.

As illustrated in FIGS. 2A and 2B, the gyroscope 11 includes a proof mass 111 that oscillates in an x-y plane. As the gyroscope 11 rotates about an axis orthogonal to the x-y plane, an axis of oscillation (V) of the proof mass 111 precesses.

The sensing module 12 detects motion of the proof mass 111, and generates a set of sensing signals that correspond to the motion of the proof mass 111 detected thereby.

The calculating module 13 calculates an angle of rotation ($\phi$) of the gyroscope 11 either based directly on the sensing signals or by calculating first an angular rate based on the sensing signals, followed by integrating the angular rate.

The angle of rotation ($\phi$) calculated by the conventional angle-measuring gyroscope system 1, however, is inaccurate. This is due to defects in the gyroscope 11 and the sensing module 12 and noise in and signal drift of the sensing signals.

Several techniques have been proposed to alleviate the aforementioned problems. These conventional techniques, however, have drawbacks. For instance, the technique, such as that disclosed in U.S. Pat. Nos. 6,481,285 and 6,928,874, requires a complex structure and calibrations to minimize the effect of defects in a gyroscope. Moreover, the technique, such as that disclosed in "A low noise capacitive sensing amplifier for CMOS-MEMS gyroscope with 1 milli-watt power dissipation," Proceedings of the Second International Workshop on Network Sensing Systems, p. 119-123, 2005, requires a complex circuit design. Further, the technique, such as that disclosed in U.S. Pat. Nos. 6,481,285, 6,928,874, and 6,934,660, "New adaptive mode of operation for MEMS gyroscopes," Journal of Dynamic Systems, $4^{th}$ quarter, vol. 126, p. 800-810, 2004, and "Dynamics and control of a MEMS angle measuring gyroscope," Sensors and Actuators A, $1^{st}$ quarter, vol. 144, p. 56-63, 2008, which calculates a set of control signals based on a set of sensing signals for controlling oscillation of a proof mass to thereby compensate the effect of defects in a gyroscope, fails to minimize the effect of defects in a sensing module and signal drift of the sensing signals.

SUMMARY OF THE INVENTION

Therefore, an object of the present invention is to provide an angle-measuring method that can overcome the aforesaid drawbacks of the prior art.

Another object of the present invention is to provide an angle-measuring gyroscope system that implements the angle-measuring method.

According to a first aspect of the present invention, there is provided an angle-measuring method for calculating an angle of rotation of a gyroscope of an angle-measuring gyroscope system. The gyroscope includes a proof mass that oscillates in an x-y plane defined by mutually orthogonal x and y axes. The angle-measuring gyroscope system includes a sensing module, a state observer, and an angle calculator. The sensing module is configured to detect motion of the proof mass, and to generate a set of sensing signals that correspond to the motion of the proof mass detected thereby and that indicate x and y components of a position of the proof mass. The angle-measuring method comprises: A) configuring the state observer to calculate a set of estimated signals based on a set of previously calculated estimated parameters, the previously calculated estimated parameters corresponding to a set of system parameters of the angle-measuring gyroscope system, the system parameters of the angle-measuring gyroscope system including x and y components of a position of the proof mass, x and y components of a velocity of the proof mass, x and y components of an error of the sensing module, and an angular rate of the gyroscope about a z-axis orthogonal to the x and y axes; B) configuring the state observer to calculate a gain thereof using a dynamic equation associated with the gyroscope; C) configuring the state observer to calculate a set of currently calculated estimated parameters using the dynamic equation associated with the gyroscope based on the gain calculated in step B), the sensing signals generated by the sensing module, and the estimated signals calculated in step A); and D) configuring the angle calculator to calculate an angle of rotation of the gyroscope about the z-axis based on a position and a velocity in the currently calculated estimated parameters calculated in step C) and a stiffness coefficient of the gyroscope.

According to a second aspect of the present invention, an angle-measuring gyroscope system comprises a gyroscope, a sensing module, and a calculating module. The gyroscope includes a proof mass that oscillates in an x-y plane defined by mutually orthogonal x and y axes. The sensing module is coupled to the gyroscope, and is configured to detect motion of the proof mass, and to generate a set of sensing signals that correspond to the motion of the proof mass detected thereby and that indicate x and y components of a position of the proof mass. The calculating module includes a state observer and an angle calculator. The state observer is coupled to the sensing module, and is configured to calculate a set of estimated signals based on a set of previously calculated estimated parameters. The previously calculated estimated parameters correspond to a set of system parameters of the angle-measuring gyroscope system. The system parameters of the angle-measuring gyroscope system includes x and y components of a position of the proof mass, x and y components of a velocity of the proof mass, x and y components of an error of the sensing module, and an angular rate of the gyroscope about a z-axis orthogonal to the x and y axes. The state observer is further configured to calculate a gain thereof using a dynamic equation associated with the gyroscope, and to calculate a set of currently calculated estimated parameters using the dynamic equation associated with the gyroscope based on the gain calculated thereby, the sensing signals generated by the sensing module, and the estimated signals calculated thereby. The angle calculator is coupled to the state observer, and is configured to calculate an angle of rotation of the gyroscope about the z-axis based on a position and a velocity in the currently calculated estimated parameters calculated by the state observer and a stiffness coefficient of the gyroscope.

According to a third aspect of the present invention, there is provided an angle-measuring method for calculating an angle of rotation of a gyroscope of an angle-measuring gyroscope system. The gyroscope includes a proof mass that oscillates in an x-y plane defined by mutually orthogonal x and y axes. The angle-measuring gyroscope system includes a sensing module, a driving module, a state observer, a control signal calculator, and an angle calculator. The sensing module is configured to detect motion of the proof mass, and to generate a set of sensing signals that correspond to the motion of the proof mass detected thereby and that indicate x and y components of a position of the proof mass. The driving module is configured to generate a set of control forces based on a set of control signals for controlling oscillation of the proof mass. The angle-measuring method comprises: A) configuring the state observer to calculate a set of estimated signals based on a set of previously calculated estimated parameters, the previously calculated estimated parameters corresponding to a set of system parameters of the angle-measuring gyroscope system, the system parameters of the angle-measuring gyroscope system including x and y components of a position of the proof mass, x and y components of a velocity of the proof mass, an angular rate of the gyroscope about a z-axis orthogonal to the x and y axes, x and y components of a stiffness coefficient of the gyroscope, a stiffness coefficient of a coupling effect of the gyroscope, x and y components of a damping coefficient of the gyroscope, and a damping coefficient of a coupling effect of the gyroscope; B) configuring the state observer to calculate a gain thereof using a dynamic equation associated with the gyroscope; C) configuring the control signal calculator to calculate the control signals based on a stiffness coefficient, a damping coefficient, a position, and a velocity in the previously calculated estimated parameters, and a predetermined target stiffness coefficient; D) configuring the state observer to calculate a set of currently calculated estimated parameters using the dynamic equation associated with the gyroscope based on the gain calculated in step B), the sensing signals generated by the sensing module, and the estimated signals calculated in step A); and E) configuring the angle calculator to calculate an angle of rotation of the gyroscope about the z-axis based on a position and a velocity in the currently calculated estimated parameters calculated in step D) and the predetermined target stiffness coefficient.

According to a fourth aspect of the present invention, an angle-measuring gyroscope system comprises a gyroscope, a sensing module, a calculating module, and a driving module. The gyroscope includes a proof mass that oscillates in an x-y plane defined by mutually orthogonal x and y axes. The sensing module is coupled to the gyroscope, and is configured to detect motion of the proof mass, and to generate a set of sensing signals that correspond to the motion of the proof mass detected thereby and that indicate x and y components of a position of the proof mass. The calculating module includes a state observer, a control signal calculator, and an angle calculator. The state observer is coupled to the sensing module, and is configured to calculate a set of estimated signals based on a set of previously calculated estimated parameters. The previously calculated estimated parameters correspond to a set of system parameters of the angle-measuring gyroscope system. The system parameters of the angle-measuring gyroscope system include x and y components of a position of the proof mass, x and y components of a velocity of the proof mass, an angular rate of the gyroscope about a z-axis orthogonal to the x and y axes, x and y components of a stiffness coefficient of the gyroscope, a stiffness coefficient of a coupling effect of the gyroscope, x and y components of a damping coefficient of the gyroscope, and a damping coefficient of a coupling effect of the gyroscope. The state observer is further configured to calculate a gain thereof using a dynamic equation associated with the gyroscope, and to calculate a set of currently calculated estimated parameters using the dynamic equation associated with the gyroscope based on the gain calculated thereby, the sensing signals generated by the sensing module, and the estimated signals calculated thereby. The control signal calculator is coupled to the state observer, and is configured to calculate a set of control signals based on a stiffness coefficient, a damping coefficient, a position, and a velocity in the previously calculated estimated parameters, and a predetermined target stiffness coefficient. The angle calculator is coupled to the state observer, and is configured to calculate an angle of rotation of the gyroscope about the z-axis based on a position and a velocity in the currently calculated estimated parameters calculated by the state observer and a stiffness coefficient of the gyroscope. The driving module is coupled to the control signal calculator of the calculating module and the gyroscope, and is configured to generate a set of control forces based on the control signals calculated by the control signal calculator for controlling oscillation of the proof mass of the gyroscope.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
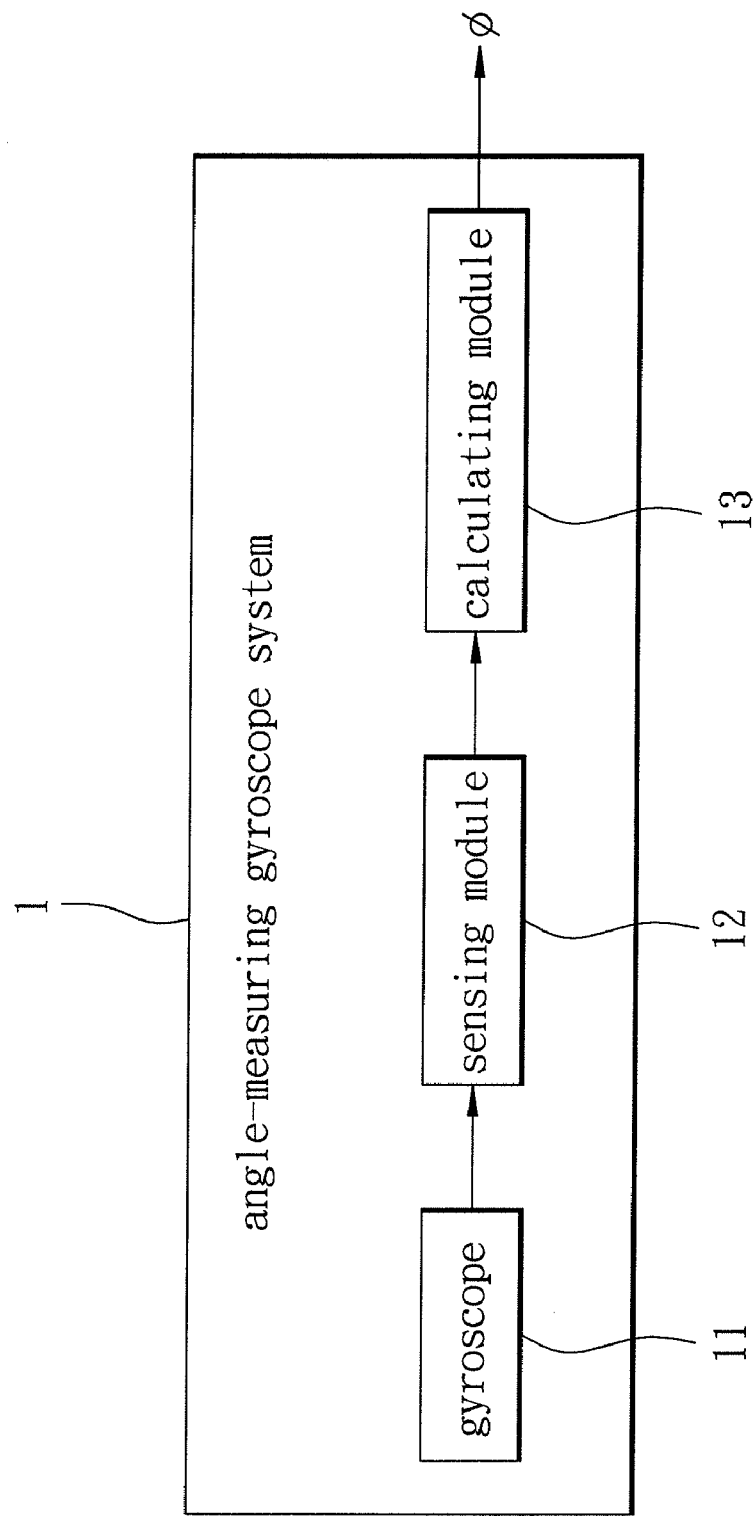
FIG. 1 is a circuit block diagram of a conventional angle-measuring gyroscope system.
Figure 2B:
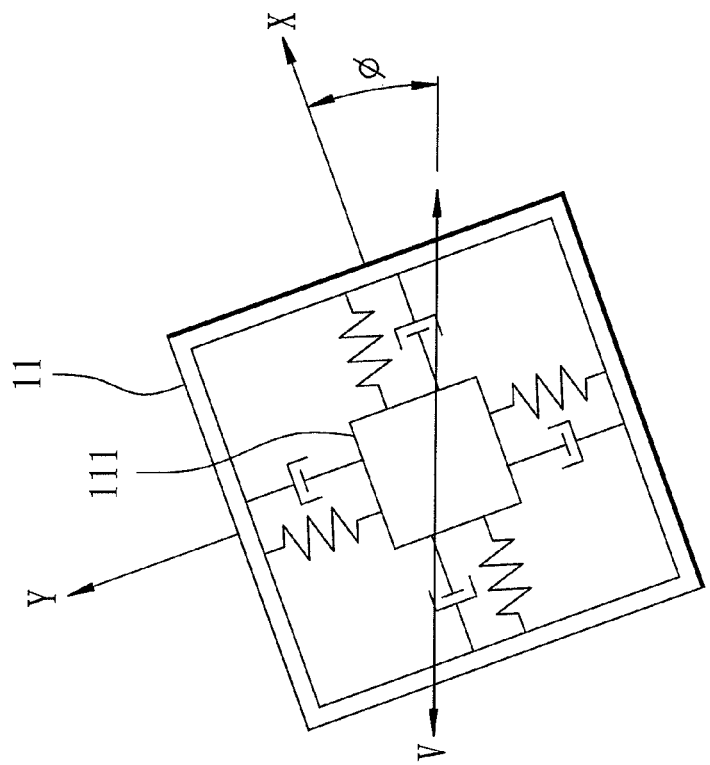
FIGS. 2A and 2B are dynamic models of a gyroscope of the conventional angle-measuring gyroscope system illustrating oscillation of a proof mass of the gyroscope.
Figure 2A:
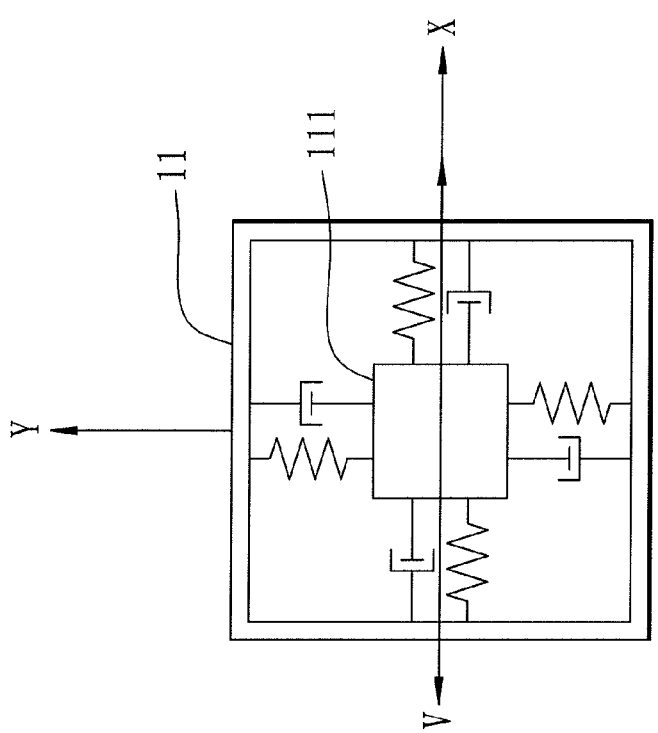
Figure 3:
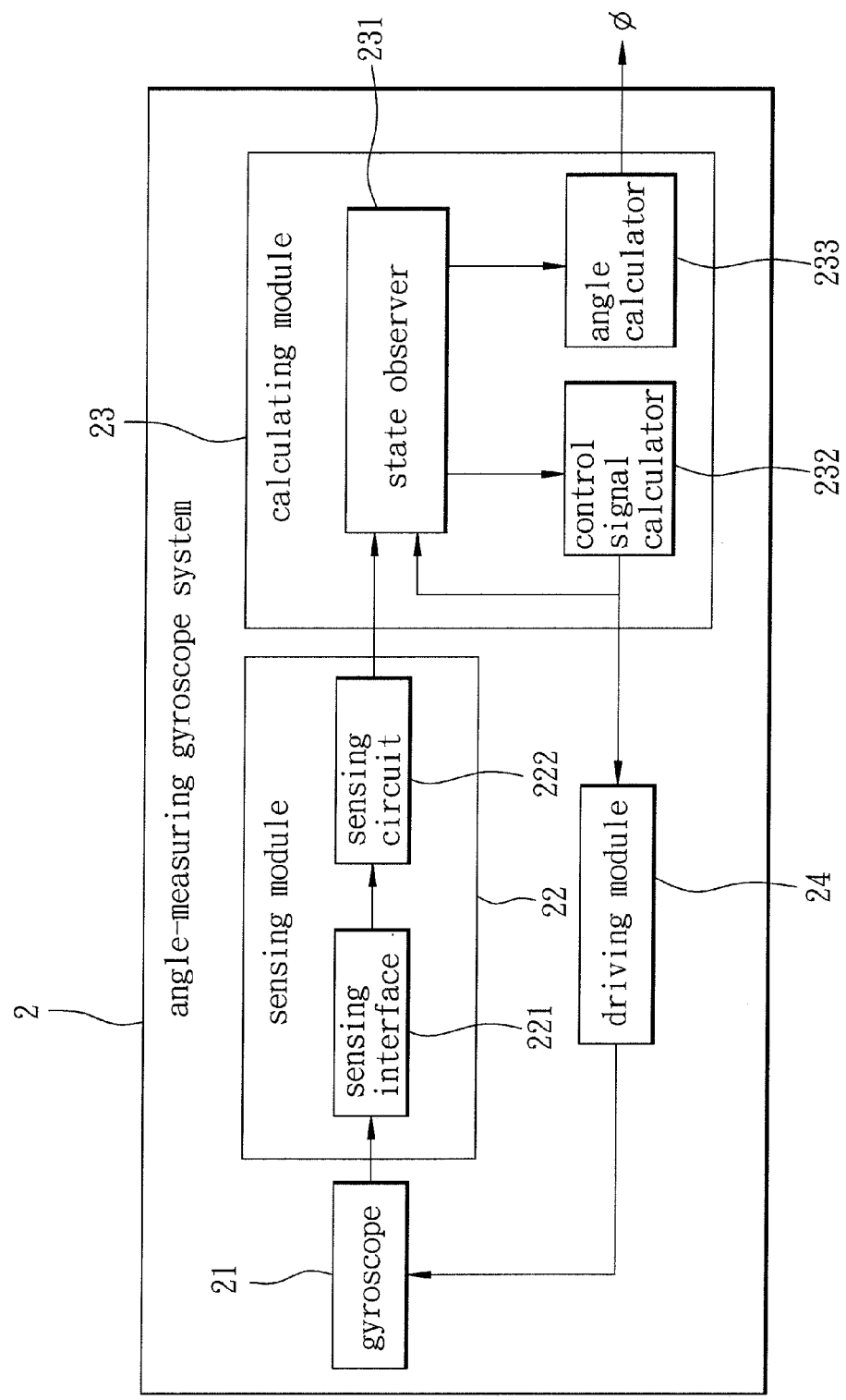
FIG. 3 is a circuit block diagram of the preferred embodiment of an angle-measuring gyroscope system according to the present invention.

Referring to FIG. 3, the preferred embodiment of an angle-measuring gyroscope system 2 according to this invention is shown to include a gyroscope 21, a sensing module 22, a calculating module 23, and a driving module 24.

Figure 4:
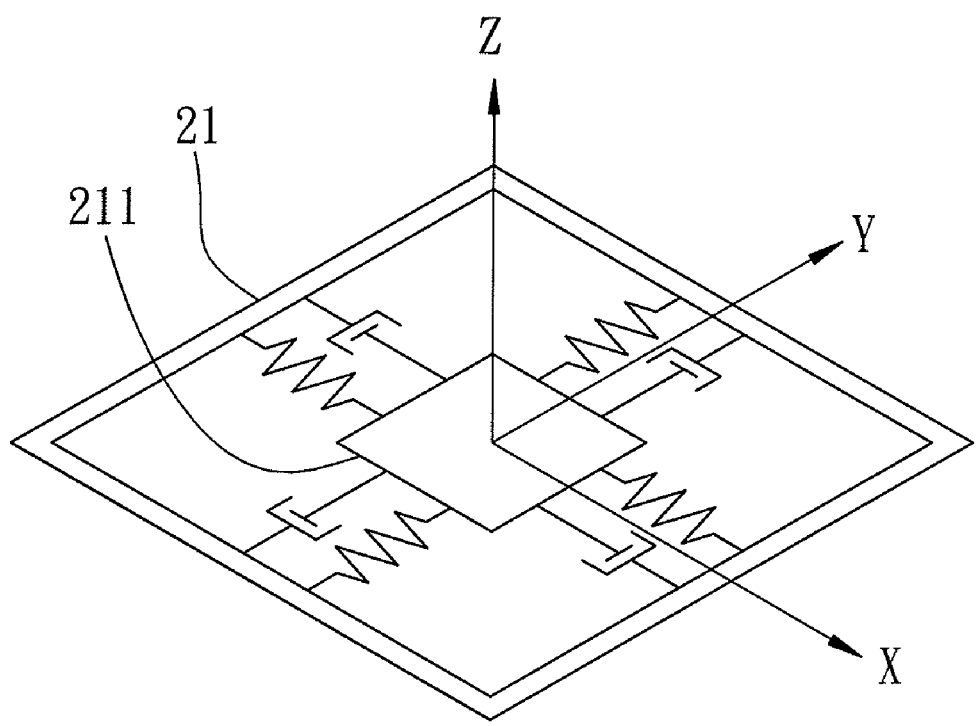
FIG. 4 is a dynamic model of a gyroscope of the preferred embodiment illustrating oscillation of a proof mass of the gyroscope.

As illustrated in FIG. 4, the gyroscope 21 includes a proof mass 211 that oscillates in an x-y plane defined by mutually orthogonal x and y axes. In this embodiment, the gyroscope 21 is a single-axis sensing gyroscope 21.

In some embodiments, the gyroscope 21 is a multi-axis sensing gyroscope 21.

The dynamic equation associated with the proof mass 211 is $$m\ddot{x}+d_{xx}\dot{x}+d_{xy}\dot{y}+k_{xx}x+k_{xy}y=u_x+2m\Omega_z\dot{y}$$

$$m\ddot{y}+d_{xy}\dot{x}+d_{yy}\dot{y}+k_{xy}x+k_{yy}y=u_y-2m\Omega_z\dot{x} \quad (1)$$

where x and y are x and y components of a position of the proof mass 211, respectively, $\dot{x}$ and $\dot{y}$ are x and y components of a velocity of the proof mass 211, i.e., first order derivatives of x and y, respectively, $\ddot{x}$ and $\ddot{y}$ are x and y components of an acceleration of the proof mass 211, i.e., second order derivatives of x and y, respectively, m is a mass of the proof mass 211, $d_{xx}$ and $d_{yy}$ are x and y components of a damping coefficient of the gyroscope 21, respectively, $k_{xx}$ and $k_{yy}$ are x and y components of a stiffness coefficient of the gyroscope 21, respectively, $d_{xy}$ and $k_{xy}$ are damping coefficient and stiffness coefficient of a coupling effect of the gyroscope 21, respectively, $\Omega_z$ is an angular rate of the gyroscope 21 about a z-axis orthogonal to the x and y axes, and $u_x$ and $u_y$ are the x and y components of a control force exerted on the gyroscope 21, respectively.

When the mass (m) of the proof mass 211 is known, Equation (1) may be normalized by division by the mass (m) of the proof mass 211, $$\ddot{x}+d'_{xx}\dot{x}+d'_{xy}\dot{y}+k'_{xx}x+k'_{xy}y=u'_x+2\Omega_z\dot{y}$$

$$\ddot{y}+d'_{xy}\dot{x}+d'_{yy}\dot{y}+k'_{xy}x+k'_{yy}y=u'_y-2\Omega_z\dot{x} \quad (2)$$

where $d'_{xx}=d_{xx}/m$, $d'_{yy}=d_{yy}/m$, $d'_{xy}=d_{xy}/m$, $k'_{xx}=k_{xx}/m$, $k'_{yy}=k_{yy}/m$, $k'_{xy}=k_{xy}/m$, $u'_x=u_x/m$, and $u'_y=u_y/m$.

It is noted that the parameters $d'_{xx}$, $d'_{yy}$, $d'_{xy}$, $k'_{xx}$, $k'_{yy}$, $k'_{xy}$, and $\Omega_z$ can vary due to the effect of defects in the gyroscope 21. In this case, the gyroscope 21 has seven unknown parameters, namely, $d'_{xx}$, $d'_{yy}$, $d'_{xy}$, $k'_{xx}$, $k'_{yy}$, $k'_{xy}$, and $\Omega_z$.

The sensing module 22 is configured to detect motion of the proof mass 211, and to generate a set of sensing signals that correspond to the motion of the proof mass 211 detected thereby. In particular, the sensing module 22 includes a sensing interface 221 and a sensing circuit 222. The sensing interface 221 is connected to the gyroscope 21, and is configured to convert motion of the proof mass 211 into capacitance.

Figure 5:
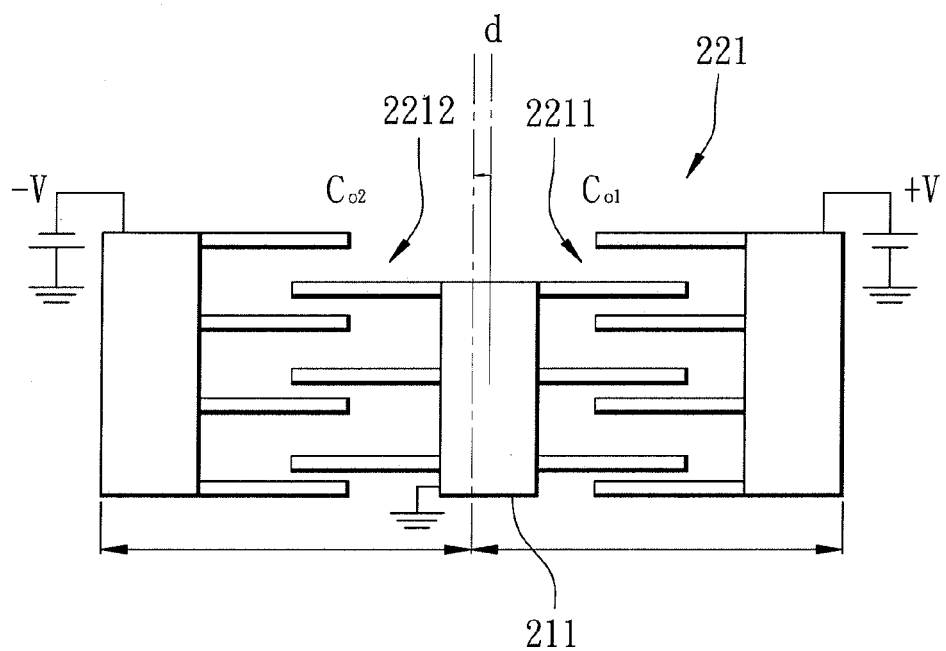
FIGS. 5 and 6 are schematic diagrams illustrating a sensing interface of a sensing module of the preferred embodiment.
Figure 6:
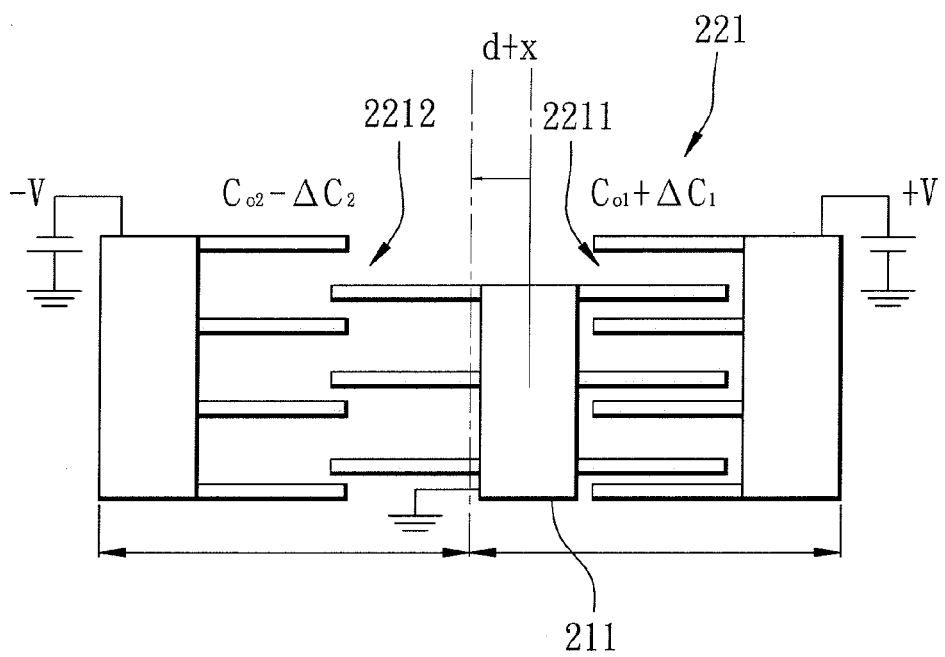

As illustrated in FIGS. 5 and 6, the sensing interface 221 employs a comb variable capacitor structure. That is, the sensing interface 221 forms a pair of differential variable capacitors 2211, 2212 in the x-axis, and another pair of differential variable capacitors (not shown) in the y-axis. The differential variable capacitors 2211, 2212 are connected in series and across positive and negative direct current (dc) bias voltage sources (+V, −V).

The difference between an initial capacitance ($C_{o1}$) of the differential variable capacitor 2211 and an initial capacitance ($C_{o2}$) of the differential variable capacitor 2212, considering deviation (d) of the proof mass 211 from an initial position thereof, can be obtained as $$C_{o1}-C_{o2}=2N\varepsilon\frac{W}{Z}d \quad (3)$$

where N is a tine number of a comb structure (N=3 in FIGS. 5 and 6), $\varepsilon$ is permittivity, and W and Z are width of and distance between overlapping areas, respectively.

When the proof mass 211 changes a position (x) thereof, the capacitance of the differential variable capacitor 2211 becomes $$C_{o1}+\Delta C_1$$

and the capacitance of the differential variable capacitor 2212 becomes $$C_{o2}-\Delta C_2 \quad (4)$$

where $$\Delta C_1=\Delta C_2=\Delta C=N\varepsilon\frac{W}{Z}x$$

In other embodiments, the sensing interface 221 converts motion of the proof mass 211 into a tunneling current, an optical image, or a resistance, such as by employing piezoresistance or piezoelectric effect.

The sensing circuit 222 is connected to the sensing interface 221, and is configured to convert the capacitance thus converted by the sensing interface 221 into the sensing signals, which are in the form of a voltage, and two of which, hereinafter referred to as the first and second sensing signals, indicate x and y components of a position of the proof mass 211, respectively.

Figure 7:
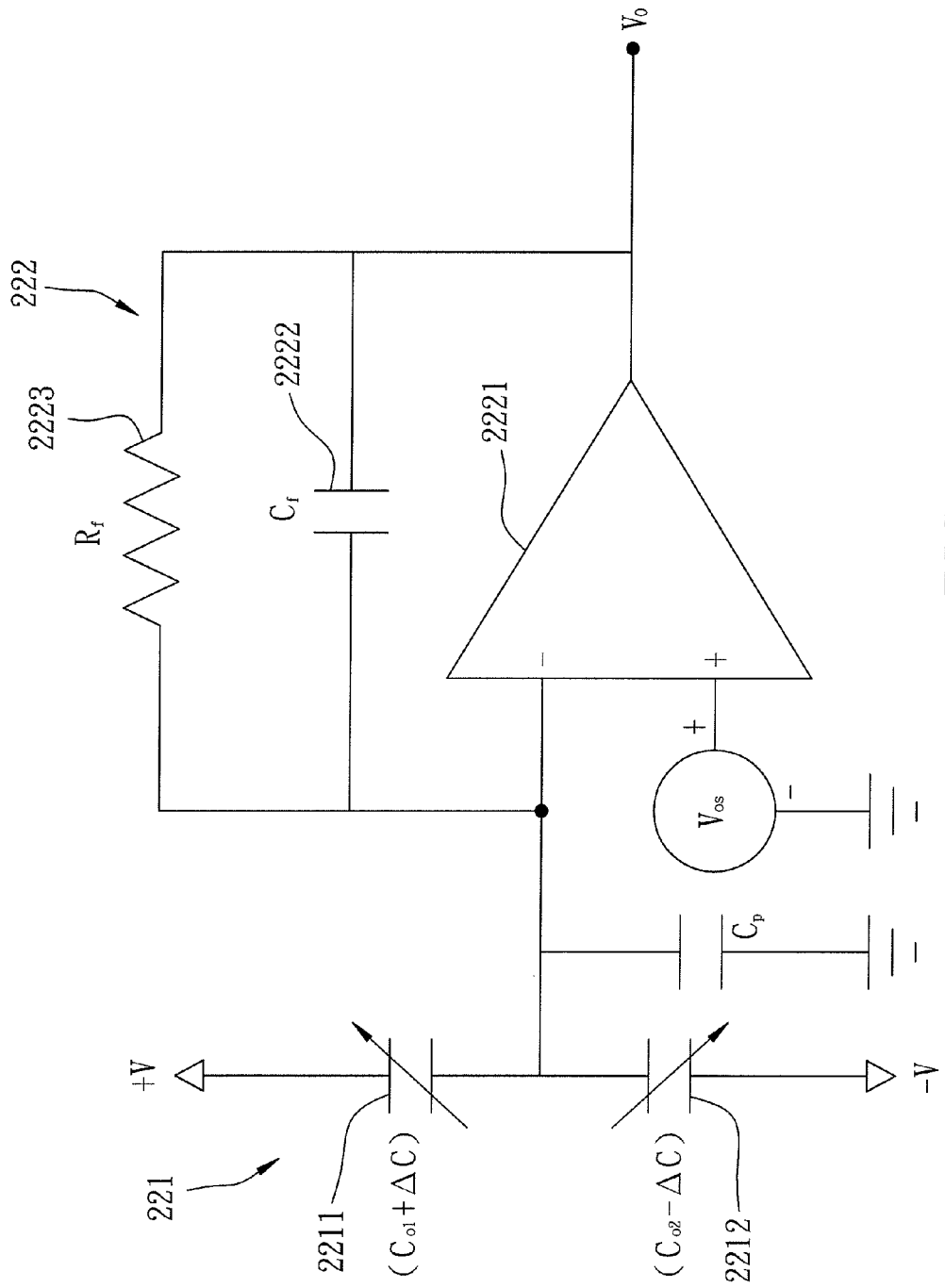
FIG. 7 is a circuit diagram illustrating a sensing circuit of the sensing module of the preferred embodiment.

As illustrated in FIG. 7, the sensing circuit 222 employs an electric charge integration structure. That is, the sensing circuit 222 forms an electric charge integrator in each of the x and y axes. The electric charge integrator includes an operational amplifier 2221, a feedback capacitor 2222, and a feedback resistor 2223. The operational amplifier 2221 has an inverting input terminal connected to a junction of the differential variable capacitors 2211, 2212 of the sensing interface 221, a grounded non-inverting input terminal, and an output terminal that provides the first/second sensing signal ($V_o$). The feedback capacitor 2222 and the feedback resistor 2223 are connected in parallel and across the inverting input terminal and the output terminal of the operational amplifier 2221.

The input offset voltage ($V_{os}$) of the operational amplifier 2221 and the parasitic capacitance ($C_p$) of conductive wires are related to the first/second sensing signal ($V_o$) by $$V_o=-\frac{2V}{C_f}\cdot\Delta C-(C_{o1}-C_{o2})\cdot\frac{V}{C_f}+(C_{o1}+C_{o2}+C_p+C_f)\cdot\frac{V_{os}}{C_f} \quad (5)$$

where $\frac{2V}{C_f}\cdot\Delta C$ defines an ideal relationship between a position of the proof mass 211 and the sensing signals, $$(C_{o1}-C_{o2})\cdot\frac{V}{C_f}$$

is the effect of defects in the sensing interface 221, and $$(C_{o1}+C_{o2}+C_p+C_f)\cdot\frac{V_{os}}{C_f}$$

is the effect of defects in the sensing circuit 222.

Combining Equations (3), (4), and (5), and taking into account noise in and signal drift of the first and second sensing signals ($V_{ox}$, $V_{oy}$), the first and second sensing signals ($V_{ox}$, $V_{oy}$) become $$\begin{bmatrix} V_{ox} \\ V_{oy} \end{bmatrix} = \begin{bmatrix} -\frac{2V}{C_{fx}} \cdot N_x \varepsilon \frac{W_x}{Z_x} x + \Phi_x + n_x \\ -\frac{2V}{C_{fy}} \cdot N_y \varepsilon \frac{W_y}{Z_y} y + \Phi_y + n_y \end{bmatrix} \quad (6)$$

where $$\Phi_x = 2N_x\varepsilon\frac{W_x}{Z_x}d_x \cdot \frac{V}{C_{fx}} + \left(2N_x\varepsilon\frac{W_x}{Z_x}x_0 + C_{px} + C_{fx}\right) \cdot \frac{V_{osx}}{C_{fx}} + \alpha_x,$$

$$\Phi_y = 2N_y\varepsilon\frac{W_y}{Z_y}d_y \cdot \frac{V}{C_{fy}} + \left(2N_y\varepsilon\frac{W_y}{Z_y}y_0 + C_{py} + C_{fy}\right) \cdot \frac{V_{osy}}{C_{fy}} + \alpha_y,$$

$\Phi_x$, $\Phi_y$ are the effect of the defects in the sensing module 22 and the effect of the signal drift of the sensing signals in the x and y axes, i.e., error of the sensing module 22, n is noise, $x_0$ and $y_0$ are the x and y components of an initial length of an overlapping area of the first and second differential variable capacitors 2211, 2212, respectively, and α is the signal drift of the sensing signals.

Due to the effect of the defects in the sensing module 22 and the effect of the signal drift of the sensing signals, the parameters $C_{px}$, $C_{py}$, $V_{osx}$, $V_{osy}$, $d_x$, $d_y$, $x_0$, $y_0$, $\alpha_x$, and $\alpha_y$ are unknown. In this case, the sensing module 22 has two unknown parameters, namely, $\Phi_x$ and $\Phi_y$.

It should be understood that the structure employed by the sensing interface 221, i.e., the comb variable capacitor structure, and the structure employed by the sensing circuit 222, i.e., the electric charge integration structure, are only exemplary and other structures may be employed.

The calculating module 23 is configured to calculate an angle of rotation (φ) of the gyroscope 21, in a manner that will be described hereinafter.

Equations (2) and (6) may be rewritten into a continuous form $$\dot{X} = f(X) + BU \quad (7)$$
$$Z = HX + \bar{n}$$

where $$X = [x \; \dot{x} \; y \; \dot{y} \; \Phi_x \; \Phi_y \; \Omega_z \; k'_{xx} \; k'_{yy} \; k'_{xy} \; d'_{xx} \; d'_{yy} \; d'_{xy}]^T,$$

$$f(X) = \begin{bmatrix} \dot{x} \\ -k'_{xx}x - k'_{xy}y - d_{xx}\dot{x} - d_{xy}\dot{y} + 2\Omega_z\dot{y} \\ \dot{y} \\ -k'_{xy}x - k'_{yy}y - d_{xy}\dot{x} - d_{yy}\dot{y} - 2\Omega_z\dot{x} \\ 0 \\ \vdots \\ 0 \end{bmatrix}_{13\times 1},$$

$$B = \begin{bmatrix} 0 & 1 & 0 & 0 & 0 & \ldots & 0 \\ 0 & 0 & 0 & 1 & 0 & \ldots & 0 \end{bmatrix}^T_{2\times 13},$$

$$U = \begin{bmatrix} u'_x \\ u'_z \end{bmatrix}, Z = \begin{bmatrix} V_{ox} \\ V_{oy} \end{bmatrix}, \bar{n} = \begin{bmatrix} n_x \\ n_y \end{bmatrix},$$

$$H = \begin{bmatrix} -\frac{2V}{C_{fx}}N_x\varepsilon\frac{W_x}{Z_x} & 0 & 0 & 0 & 1 & 0 & 0 & \ldots & 0 \\ 0 & 0 & -\frac{2V}{C_{fy}}N_y\varepsilon\frac{W_y}{Z_y} & 0 & 0 & 1 & 0 & \ldots & 0 \end{bmatrix}_{2\times 13},$$

X are system parameters of the angle-measuring gyroscope system, $\dot{X}$ is the first order derivative of X, U are control signals that correspond to control forces exerted on the proof mass 211, Z are the sensing signals, $\dot{X}=f(X)+BU$ is the dynamic equation associated with the gyroscope 21, Z=HX defines an ideal relationship between the system parameters and the sensing signals, H is known, and $\bar{n}$ is noise.

For performing iterative calculations, Equation (7) is rewritten into a discrete form $$X_{m+1} = f_d(X_m) + BU_m$$
$$Z_m = HX_m \quad (8)$$

where m is the mth iteration and d denotes discrete.

Based from Equation (8), a discrete state observer can be established. Hence, Equation (8) becomes $$\hat{X}_{m+1} = f_d(\hat{X}_m) + BU_m + L_m(Z_m - \hat{Z}_m)$$
$$\hat{Z}_m = H\hat{X}_m \quad (9)$$

where $\hat{X}$ are estimated parameters that correspond to the system parameters, L is a gain of the state observer 231, $U_m$ are the control signals, and $\hat{Z}$ are estimated signals that correspond to the sensing signals.

The control signals ($U_m$) are defined as $$U_m = \begin{bmatrix} \hat{d}_{xx}\hat{\dot{x}} + \hat{d}_{xy}\hat{\dot{y}} + \hat{k}_{xx}\hat{x} + \hat{k}_{xy}\hat{y} - k\hat{x} \\ \hat{d}_{xy}\hat{\dot{x}} + \hat{d}_{yy}\hat{\dot{y}} + \hat{k}_{xy}\hat{x} + \hat{k}_{yy}\hat{y} - k\hat{y} \end{bmatrix}_m \quad (10)$$

where $\hat{x}$ and $\hat{y}$ are the x and y components of an estimated position of the proof mass 211, respectively, $\hat{\dot{x}}$ and $\hat{\dot{y}}$ are the x and y components of an estimated velocity of the proof mass 211, respectively, and k is a predetermined target stiffness coefficient.

It is noted that, after several iterations, the estimated parameters, whereby the system parameters are obtained, are increasingly accurate. At the same time, the stiffness coefficient of the gyroscope 21 approaches a target stiffness coefficient and the damping coefficient of the gyroscope 21 approaches a target damping coefficient, i.e., zero. With these simplifications, Equation (2) becomes $$\ddot{x} + kx = 2\Omega_z\dot{y}$$
$$\ddot{y} + ky = -2\Omega_z\dot{x} \quad (11)$$

The angle of rotation (φ) can be derived using Equation (11), as proposed by B. Friedland and M. Hutton, 1978, and is defined as $$\tan 2\phi = \frac{2(k\hat{x}\hat{y} + \hat{\dot{x}}\hat{\dot{y}})}{k(\hat{x}^2 - \hat{y}^2) + (\hat{\dot{x}}^2 - \hat{\dot{y}}^2)} \quad (12)$$

In this embodiment, the calculating module 23 includes a state observer 231, a control signal calculator 232, and an angle calculator 233. The state observer 231 is connected to the sensing circuit 222 of the sensing module 22, and is configured to calculate a set of estimated parameters using Equation (9). The control signal calculator 232 is connected to the state observer 231 and is configured to calculate a set of control signals using Equation (10). The angle calculator 233 is connected to the state observer 231 and is configured to calculate an angle of rotation of the gyroscope 21 using Equation (12).

The state observer 231 is further configured to calculate a gain thereof using the dynamic equation associated with the gyroscope 21, an extended Kalman filter (EKF), and a fading memory technique.

By using the extended Kalman filter (EKF), the effect of noise is minimized. Moreover, by using the fading memory technique, accurate estimated parameters, which serve as the system parameters, can be calculated from time-varying ones of the system parameters.

The EKF and the fading memory technique are described in detail in Y. Bar-Shalom, X. R. Li and T. Kirubarajan, "Estimation with applications to tracking and navigation," John Wiley and Sons, 2003.

The driving module 24 is connected to the control signal calculator 232 of the calculating module 23 and the gyroscope 21, and generates a set of control forces based on the control signals calculated by the control signal calculator 232 for controlling oscillation of the proof mass 211 to compensate the defects in the gyroscope 21.

It is noted that, a conventional state observer calculates dynamic parameters, which indicates motion states, of a system, based on a set of sensing signals of the system, assuming that the fixed parameters of the system are known. In contrast, the state observer 231 in this invention simply calculates a set of estimated parameters using Equation (9), whereby fixed parameters, e.g., stiffness and damping coefficients, and dynamic parameters, e.g., position, velocity, and angular rate, in the system parameters are obtained.

In this embodiment, the calculating module 23 calculates for the six unknown normalized parameters of the gyroscope 21, i.e., $d'_{xx}$, $d'_{yy}$, $d'_{xy}$, $k'_{xx}$, $k'_{yy}$, and $k'_{xy}$, and two normalized control signals, i.e., $u'_x$ and $u'_y$, that correspond to the control forces.

In some embodiments, the calculating module 23 calculates for six unknown non-normalized parameters of the gyroscope 21, i.e., $d_{xx}$, $d_{yy}$, $d_{xy}$, $k_{xx}$, $k_{yy}$, and $k_{xy}$, two non-normalized control signals, i.e., $u_x$ and $u_y$, that correspond to the control forces.

Figure 8:
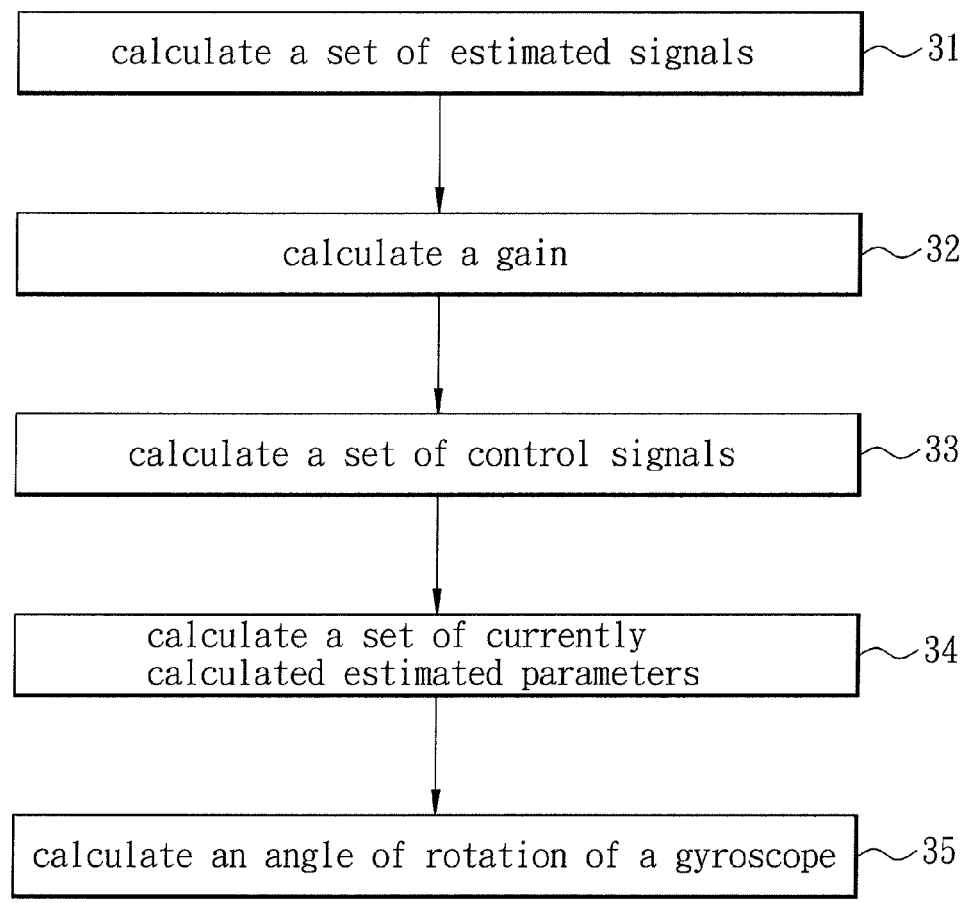
FIG. 8 is a flowchart of the preferred embodiment of an angle-measuring method according to the present invention to be implemented using the angle-measuring gyroscope system shown in FIG. 3.

The preferred embodiment of an angle-measuring method to be implemented by the aforementioned angle-measuring gyroscope system 2 according to this invention will now be described with further reference to FIG. 8.

In step 31, the state observer 231 is configured to calculate a set of estimated signals based on a set of previously calculated estimated parameters.

The previously calculated estimated parameters include stiffness coefficients, damping coefficients, a position, and a velocity.

In step 32, the state observer 231 is configured to calculate a gain thereof using the dynamic equation associated with the gyroscope 21.

In step 33, the control signal calculator 232 is configured to calculate a set of control signals based on the stiffness coefficient, the damping coefficient, the position, and the velocity in the previously calculated estimated parameters used to calculate the estimated signals in step 31 and a target stiffness coefficient.

In step 34, the state observer 231 is configured to calculate a set of currently calculated estimated parameters using the dynamic equation associated with the gyroscope 21 based on the gain calculated in step 32, the sensing signals generated by the sensing module 22, and the estimated signals calculated in step 31.

The currently calculated estimated parameters calculated in this step correspond to the previously calculated estimated parameters from which the estimated signals are calculated in step 31.

In step 35, the angle calculator 233 is configured to calculate an angle of rotation of the gyroscope 21 about the z-axis based on a position and a velocity in the currently calculated estimated parameters calculated in step 34 and a target stiffness coefficient.

From the above description, the state observer 231 of the calculating module 23 calculates parameters of the gyroscope 21 and error in the sensing signals. As such, the effect of defects in the gyroscope 21, the effect of defects in the sensing module 22, and the effect of signal drift of the sensing signals can be minimized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An angle-measuring method for calculating an angle of rotation of a gyroscope of an angle-measuring gyroscope system, the gyroscope including a proof mass that oscillates in an x-y plane defined by mutually orthogonal x and y axes, the angle-measuring gyroscope system including a sensing module, a state observer, and an angle calculator, the sensing module being configured to detect motion of the proof mass, and to generate a set of sensing signals that correspond to the motion of the proof mass detected thereby and that indicate x and y components of a position of the proof mass, said angle-measuring method comprising:

A) configuring the state observer to calculate a set of estimated signals based on a set of previously calculated estimated parameters, the previously calculated estimated parameters corresponding to a set of system parameters of the angle-measuring gyroscope system, the system parameters of the angle-measuring gyroscope system including x and y components of a position of the proof mass, x and y components of a velocity of the proof mass, x and y components of an error of the sensing module, and an angular rate of the gyroscope about a z-axis orthogonal to the x and y axes;

B) configuring the state observer to calculate a gain thereof using a dynamic equation associated with the gyroscope;

C) configuring the state observer to calculate a set of currently calculated estimated parameters using the dynamic equation associated with the gyroscope based on the gain calculated in step B), the sensing signals generated by the sensing module, and the estimated signals calculated in step A); and D) configuring the angle calculator to calculate an angle of rotation of the gyroscope about the z-axis based on a position and a velocity in the currently calculated estimated parameters calculated in step C) and a stiffness coefficient of the gyroscope.

2. The angle-measuring method as claimed in claim 1, wherein the currently calculated estimated parameters calculated in step C) correspond to the previously calculated estimated parameters from which the estimated signals are calculated in step A).

3. The angle-measuring method as claimed in claim 1, wherein, in step D), the angle of rotation ($\phi$) of the gyroscope is calculated according to $$\tan 2\phi = \frac{2(k\hat{x}\hat{y} + \dot{\hat{x}}\dot{\hat{y}})}{k(\hat{x}^2 - \hat{y}^2) + (\dot{\hat{x}}^2 - \dot{\hat{y}}^2)}$$

where $\hat{x}$ and $\hat{y}$ are the x and y components of the position of the proof mass in the currently calculated estimated parameters calculated in step C), respectively, $\dot{\hat{x}}$ and $\dot{\hat{y}}$ are the x and y components of the velocity of the proof mass in the currently calculated estimated parameters calculated in step C), respectively, and k is the stiffness coefficient of the gyroscope.

4. The angle-measuring method as claimed in claim 1, wherein, in step C), the currently calculated estimated parameters ($\hat{X}_{m+1}$) are calculated according to $$\hat{X}_{m+1} = f_d(\hat{X}_m) + L_m(Z_m - \hat{Z}_m)$$

where $\hat{\dot{X}} = f_d(\hat{X})$ is the dynamic equation associated with the gyroscope, $\hat{X}_m$ are the previously calculated estimated parameters, L is the gain calculated in step B), Z are the sensing signals generated by the sensing module, $\hat{Z}$ are the estimated signals calculated in step A), and m is the mth iteration.

5. The angle-measuring method as claimed in claim 1, wherein, in step B), the gain of the state observer is calculated further using an extended Kalman filter (EKF).

6. The angle-measuring method as claimed in claim 5, wherein, in step B), the gain of the state observer is calculated further using a fading memory technique.

7. An angle-measuring gyroscope system, comprising:
a gyroscope including a proof mass that oscillates in an x-y plane defined by mutually orthogonal x and y axes;
a sensing module coupled to said gyroscope, and configured to detect motion of said proof mass, and to generate a set of sensing signals that correspond to the motion of said proof mass detected thereby and that indicate x and y components of a position of said proof mass; and
a calculating module including
a state observer coupled to said sensing module, and configured to calculate a set of estimated signals based on a set of previously calculated estimated parameters, the previously calculated estimated parameters corresponding to a set of system parameters of said angle-measuring gyroscope system, the system parameters of said angle-measuring gyroscope system including x and y components of a position of said proof mass, x and y components of a velocity of said proof mass, x and y components of an error of said sensing module, and an angular rate of said gyroscope about a z-axis orthogonal to the x and y axes, said state observer being further configured to calculate a gain thereof using a dynamic equation associated with said gyroscope, and to calculate a set of currently calculated estimated parameters using the dynamic equation associated with said gyroscope based on the gain calculated thereby, the sensing signals generated by said sensing module, and the estimated signals calculated thereby, and
an angle calculator coupled to said state observer, and configured to calculate an angle of rotation of said gyroscope about the z-axis based on a position and a velocity in the currently calculated estimated parameters calculated by said state observer and a stiffness coefficient of said gyroscope.

8. The angle-measuring gyroscope system as claimed in claim 7, wherein the currently calculated estimated parameters calculated by said state observer correspond to the previously calculated estimated parameters from which said state observer calculates the estimated signals.

9. The angle-measuring gyroscope system as claimed in claim 7, wherein the gain of said state observer is calculated by said state observer through further use of an extended Kalman filter (EKF).

10. The angle-measuring gyroscope system as claimed in claim 9, wherein the gain of said state observer is calculated by said state observer through further use of a fading memory technique.

11. An angle-measuring method for calculating an angle of rotation of a gyroscope of an angle-measuring gyroscope system, the gyroscope including a proof mass that oscillates in an x-y plane defined by mutually orthogonal x and y axes, the angle-measuring gyroscope system including a sensing module, a driving module, a state observer, a control signal calculator, and an angle calculator, the sensing module being configured to detect motion of the proof mass, and to generate a set of sensing signals that correspond to the motion of the proof mass detected thereby and that indicate x and y components of a position of the proof mass, the driving module being configured to generate a set of control forces based on a set of control signals for controlling oscillation of the proof mass, said angle-measuring method comprising:

A) configuring the state observer to calculate a set of estimated signals based on a set of previously calculated estimated parameters, the previously calculated estimated parameters corresponding to a set of system parameters of the angle-measuring gyroscope system, the system parameters of the angle-measuring gyroscope system including x and y components of a position of the proof mass, x and y components of a velocity of the proof mass, an angular rate of the gyroscope about a z-axis orthogonal to the x and y axes, x and y components of a stiffness coefficient of the gyroscope, a stiffness coefficient of a coupling effect of the gyroscope, x and y components of a damping coefficient of the gyroscope, and a damping coefficient of a coupling effect of the gyroscope;

B) configuring the state observer to calculate a gain thereof using a dynamic equation associated with the gyroscope;

C) configuring the control signal calculator to calculate the control signals based on a stiffness coefficient, a damping coefficient, a position, and a velocity in the previously calculated estimated parameters, and a predetermined target stiffness coefficient;

D) configuring the state observer to calculate a set of currently calculated estimated parameters using the dynamic equation associated with the gyroscope based on the gain calculated in step B), the sensing signals generated by the sensing module, and the estimated signals calculated in step A); and E) configuring the angle calculator to calculate an angle of rotation of the gyroscope about the z-axis based on a position and a velocity in the currently calculated estimated parameters calculated in step D) and the predetermined target stiffness coefficient.

12. The angle-measuring method as claimed in claim 11, wherein the currently calculated estimated parameters calculated in step D) correspond to the previously calculated estimated parameters from which the estimated signals are calculated in step A).

13. The angle-measuring method as claimed in claim 11, wherein the system parameters of the angle-measuring gyroscope system further include x and y components of an error of the sensing module.

14. The angle-measuring method as claimed in claim 11, wherein the x and y components of the stiffness coefficient of the gyroscope, the stiffness coefficient of the coupling effect of the gyroscope, the x and y components of the damping coefficient of the gyroscope, and the damping coefficient of the coupling effect of the gyroscope are normalized parameters and are normalized using a mass of the proof mass.

15. The angle-measuring method as claimed in claim 11, wherein the x and y components of the stiffness coefficient of the gyroscope, the stiffness coefficient of the coupling effect of the gyroscope, the x and y components of the damping coefficient of the gyroscope, and the damping coefficient of the coupling effect of the gyroscope are non-normalized parameters.

16. The angle-measuring method as claimed in claim 11, wherein, in step E), the angle of rotation ($\phi$) of the gyroscope is calculated according to $$\tan 2\phi = \frac{2(k\hat{x}\hat{y} + \dot{\hat{x}}\dot{\hat{y}})}{k(\hat{x}^2 - \hat{y}^2) + (\dot{\hat{x}}^2 - \dot{\hat{y}}^2)}$$

where $\hat{x}$ and $\hat{y}$ are the x and y components of the position of the proof mass in the currently calculated estimated parameters calculated in step D), respectively, $\dot{\hat{x}}$ and $\dot{\hat{y}}$ are the x and y components of the velocity of the proof mass in the currently calculated estimated parameters calculated in step D), respectively, and k is the predetermined target stiffness coefficient.

17. The angle-measuring method as claimed in claim 11, wherein, in step D), the currently calculated estimated parameters ($\hat{X}_{m+1}$) are calculated according to $$\hat{X}_{m+1} = f_d(\hat{X}_m) + BU_m + L_m(Z_m - \hat{Z}_m)$$

where $\hat{X} = f_d(\hat{X}) + BU$ is the dynamic equation associated with the gyroscope, $\hat{X}_m$ are the previously calculated estimated parameters, U are the control signals calculated in step C), L is the gain calculated in step B), Z are the sensing signals generated by the sensing module, $\hat{Z}$ are the estimated signals calculated in step A), and m is the mth iteration.

18. The angle-measuring method as claimed in claim 11, wherein, in step B), the gain of the state observer is calculated further using an extended Kalman filter (EKF).

19. The angle-measuring method as claimed in claim 18, wherein, in step B), the gain of the state observer is calculated further using a fading memory technique.

20. An angle-measuring gyroscope system, comprising:
a gyroscope including a proof mass that oscillates in an x-y plane defined by mutually orthogonal x and y axes;
a sensing module coupled to said gyroscope, and configured to detect motion of said proof mass, and to generate a set of sensing signals that correspond to the motion of said proof mass detected thereby and that indicate x and y components of a position of said proof mass;
a calculating module including
a state observer coupled to said sensing module, and configured to calculate a set of estimated signals based on a set of previously calculated estimated parameters, the previously calculated estimated parameters corresponding to a set of system parameters of said angle-measuring gyroscope system, the system parameters of said angle-measuring gyroscope system including x and y components of a position of said proof mass, x and y components of a velocity of said proof mass, an angular rate of said gyroscope about a z-axis orthogonal to the x and y axes, x and y components of a stiffness coefficient of said gyroscope, a stiffness coefficient of a coupling effect of said gyroscope, x and y components of a damping coefficient of said gyroscope, and a damping coefficient of a coupling effect of said gyroscope, said state observer being further configured to calculate a gain thereof using a dynamic equation associated with said gyroscope, and to calculate a set of currently calculated estimated parameters using the dynamic equation associated with said gyroscope based on the gain calculated thereby, the sensing signals generated by said sensing module, and the estimated signals calculated thereby,
a control signal calculator coupled to said state observer, and configured to calculate a set of control signals based on a stiffness coefficient, a damping coefficient, a position, and a velocity in the previously calculated estimated parameters, and a predetermined target stiffness coefficient, and
an angle calculator coupled to said state observer, and configured to calculate an angle of rotation of said gyroscope about the z-axis based on a position and a velocity in the currently calculated estimated parameters calculated by said state observer and a stiffness coefficient of said gyroscope; and
a driving module coupled to said control signal calculator of said calculating module and said gyroscope, and configured to generate a set of control forces based on the control signals calculated by said control signal calculator for controlling oscillation of said proof mass of said gyroscope.

21. The angle-measuring gyroscope system as claimed in claim 20, wherein the currently calculated estimated parameters calculated by said state observer correspond to the previously calculated estimated parameters from which said state observer calculates the estimated signals.

22. The angle-measuring gyroscope system as claimed in claim 20, wherein the system parameters of said angle-measuring gyroscope system further include x and y components of an error of said sensing module.

23. The angle-measuring gyroscope system as claimed in claim 20, wherein the x and y components of the stiffness coefficient of said gyroscope, the stiffness coefficient of the coupling effect of said gyroscope, the x and y components of the damping coefficient of said gyroscope, and the damping coefficient of the coupling effect of said gyroscope are normalized parameters and are normalized using a mass of said proof mass.

24. The angle-measuring gyroscope system as claimed in claim 20, wherein the x and y components of the stiffness coefficient of said gyroscope, the stiffness coefficient of the coupling effect of said gyroscope, the x and y components of the damping coefficient of said gyroscope, and the damping coefficient of the coupling effect of said gyroscope are non-normalized parameters.

25. The angle-measuring gyroscope system as claimed in claim 20, wherein the gain of said state observer is calculated by said state observer through further use of an extended Kalman filter (EKF).

26. The angle-measuring gyroscope system as claimed in claim 25, wherein the gain of said state observer is calculated by said state observer calculates through further use of a fading memory technique.

* * * * *